United States Patent [19]

Morrow

[11] Patent Number: 5,076,360
[45] Date of Patent: Dec. 31, 1991

[54] PRIMING METHODS FOR VACUUM EXTRACTION WELLS

[75] Inventor: Steven R. Morrow, Hatboro, Pa.
[73] Assignee: Dames & Moore, Los Angeles, Calif.
[21] Appl. No.: 504,240
[22] Filed: Apr. 4, 1990

Related U.S. Application Data

[63] Continuation-in-part of Ser. No. 413,273, Sep. 27, 1989.

[51] Int. Cl.$^5$ .............................................. E21B 43/20
[52] U.S. Cl. .................................. 166/267; 166/370; 166/372
[58] Field of Search ............... 166/267, 369, 370, 372, 166/68

[56] References Cited

U.S. PATENT DOCUMENTS

| | | |
|---|---|---|
| 260,803 | 7/1882 | Tichenor . |
| 528,449 | 10/1894 | Staley .......................... 166/267 X |
| 1,102,152 | 6/1914 | Jones ........................... 166/267 X |
| 1,272,625 | 7/1918 | Cooper ............................. 166/68 |
| 2,423,653 | 7/1947 | Lauman ............................ 166/68 |
| 3,019,838 | 2/1962 | Harlan et al. ..................... 166/39 |
| 3,743,355 | 7/1973 | Blackwell et al. ................ 299/12 |
| 4,017,120 | 4/1977 | Carlson et al. ............... 166/372 X |
| 4,059,156 | 11/1977 | Berg ............................... 166/372 |
| 4,183,407 | 1/1980 | Knopik ............................ 166/314 |
| 4,265,312 | 5/1981 | Thein ............................ 166/68 X |
| 4,323,122 | 4/1982 | Knopik ............................ 166/267 |
| 4,345,647 | 8/1982 | Carmichael ........................ 166/66 |
| 4,444,260 | 4/1984 | Boyd et al. ...................... 166/267 |
| 4,593,760 | 6/1986 | Visser et al. .................... 166/267 |
| 4,660,639 | 4/1987 | Visser et al. .................... 166/267 |
| 4,730,672 | 3/1988 | Payne ............................. 166/266 |
| 4,886,119 | 12/1989 | Bernhardt et al. ................. 166/267 |
| 4,890,673 | 1/1990 | Payne ............................. 166/266 |
| 4,892,664 | 1/1990 | Miller ............................ 210/747 |
| 4,945,988 | 8/1990 | Payne et al. ................... 166/370 X |

OTHER PUBLICATIONS

API Publication No. 4429 "Examination of Venting for Removal of Gasoline Vapors from Contaminated Soil" (Mar. 1980).
Morrison, "Ground Water Monitoring Technology. Procedures, Equipment and Applications", (1983), pp. 78-79.
Stinson, "EPA Site Demonstration of the Terra-Vac In Situ Vacuum Extraction Process in Groveland, Massachusetts" (1989).

Primary Examiner—Hoang C. Dang
Attorney, Agent, or Firm—Woodcock Washburn Kurtz Mackiewicz & Norris

[57] ABSTRACT

Methods and apparatus for vacuum extraction of contaminants from the ground which, in a preferred embodiment, involves vacuum withdrawal of liquid and gaseous phases as a common stream, separation of the liquid and gaseous phases, and subsequent treatment of the separated liquid and gases to produce clean effluent. A primed vacuum extraction employs a single vacuum generating device to remove contaminants in both the liquid stream and soil gases through a single well casing utilizing a priming tube which introduces air or other gas to the liquid collected at the bottom of a well. The present invention permits vacuum extraction of both liquids and gases from the subsurface by way of wells having a liquid layer which is more than thirty feet below the soil surface or in which a screened interval of the extraction pipe is entirely below the liquid surface.

5 Claims, 3 Drawing Sheets

PRIMING METHODS FOR VACUUM EXTRACTION WELLS

This a continuation-in-part of U.S. patent application Ser. No. 413,273 filed on Sept. 27, 1989.

This invention relates to processes and apparatus for removing chemical contaminants from soil and more particularly, in certain embodiments, to processes and apparatus for (1) the removal from soil of volatile organic compounds, (2) continuous and simultaneous remediation of the treated soil and (3) the removal of ground water and suspended or dissolved contaminants. The present invention provides methods and apparatus for the extraction of contaminants which are not subject to limitations due to the depth at which a liquid layer is found in the soil being remediated.

BACKGROUND OF THE INVENTION

Contaminants may exist in subsurface soil in the liquid or vapor phase as discrete substances and mixed with and/or dissolved in ground water and soil gases. Such contaminants may be found and dealt with in accordance with this invention in the vadose (unsaturated) zone found between the surface of the earth and the water table, at the interface between the vadose zone and the water table, and in the saturated zone below the water table.

At many industrial and commercial facilities and at waste handling and disposal sites, soil and ground water are contaminated with suspended or water-soluble chemicals, or both. A variety of techniques have been used for removal of soil contaminants and remediation of affected soil. One common technique involves the excavation and off-site treatment of the soil. Another technique involves saturating the contaminated soil with water in situ, causing the contaminants to be slowly leached from the soil by the water. The contaminated water can then be removed.

Techniques have also been proposed for removing volatile organic contaminants from soil by vacuum extraction. For example, in U.S. Pat. No. 4,323,122, it was proposed that a vacuum be applied in a borehole at the level of the water table, the assumption being that a contaminant such as gasoline, which is lighter than water for example, would float on the water table and present a layer which could be drawn off by vacuum applied to the liquid at or around that level.

Others have suggested the possibility of venting soil above the water table (i.e., in the vadose zone) to cause vaporization of the contaminant in the soil, and then drawing off the contaminant in the vapor phase. Thus, conventional vacuum extraction systems are designed to clean the vadose zone by applying vacuum to draw air through the soil through wells having screening which does not extend below the water table. Ground water requiring treatment is in such processes conventionally removed by pumping from separate conventional water wells. In situations in which water does flow into vacuum extraction wells, it has been suggested that a second, liquid phase pump be placed either in the well or at the surface to remove the water through a second conduit. Thus, conventionally, water wells separate and apart from vacuum extraction wells may be required at a given site, and water pumps in addition to vacuum generation devices may be employed. Such extraction systems are therefore referred to as single phase extraction systems since contaminants are extracted in separate, single phases.

Processes and apparatus for two phase extraction of contaminants from the soil, in which contaminants are typically present in the vadose zone and below the water table have also been proposed. In accordance with the invention disclosed in U.S. patent application Ser. No. 413,237, filed on Sept. 27, 1989, a two phase vacuum extraction system, wherein a single vacuum device removes contaminants in both the liquid and vapor phase by way of a single conduit formed by the well casing can effectively remediate a site. The process disclosed involves the steps of providing a borehole in the contaminated area; placing a riser pipe in the borehole, the riser pipe preferably being constructed so as to admit fluids both from the vadose zone and from below the natural water table; applying a vacuum to the riser pipe so as to draw soil gases and entrained liquid into the riser pipe and to transport both the gases and the liquid to the surface; separating the liquid and the gases, and separately subjecting the separated liquid and gases to appropriate treatment. Treated water may be returned to the soil or disposed of in conventional ways. In one embodiment of this invention, the well casing is constructed with perforations (screening) extending below the natural water table and also upward into the unsaturated (vadose) zone. The unsaturated zone may be the natural vadose zone lying above the natural water table, or an expanded "artificial" vadose zone created when removal of the ground water through the extraction well causes local lowering of the water table. Placing of the screening so that it extends into the vadose zone allows soil gases, including contaminants in the vapor phase, to be drawn into the well under the influence of a vacuum generator. The gases, it has been found, entrain the liquid phase, so that both phases may be transported to the surface together in a common stream. At the surface, the two phases are separated in a vapor-liquid disengaging vessel, such as a cyclone separator, knock-out pot or other suitable component, and after separation the phases may individually be routed to systems for contaminant removal by further treatment steps. Suitable processes for contaminant removal include filtration, adsorption, air stripping, settling, flocculation, precipitation, scrubbing and the like.

As an alternative, to the above described process, U.S. patent application Ser. No. 413,273, filed on Sept. 27, 1989 also discloses a treatment well constructed so that screening is at all times is below the water table, even in the situation in which removal of water causes local depression of the water table. In such an arrangement, the fluid transported to the surface would predominantly be in the liquid phase, although it may still be necessary to provide vapor-liquid separation and individual phase treatment at the surface to deal with phase transformation which may occur as a result of turbulence and pressure reduction at the suction side of the vacuum device.

Two phase vacuum extraction in accordance with U.S. patent application Ser. No. 413,273, filed on Sept. 27, 1989 is an improvement over known soil and ground water remediation vacuum extraction techniques which simplifies equipment requirements and increases the rate of recovery of ground water. Unlike the prior art, water wells and pumps distinct from the extraction well are not required. A single vacuum device serves to remove contaminants in both the vapor and liquid phases, using a single conduit. However, a severe practical limitation to the system disclosed by U.S. patent application Ser. No. 413,273, filed on Sept. 27, 1989 exists in that, at best, a conventional vacuum pump can create a negative pressure of about one atmosphere (760 torr). Relating this fact to the hydrodynamic head of the well, one of ordinary skill will realize that when the riser pipe extends into liquid and the length of the riser pipe exceeds about thirty (30) feet, the vacuum pump will not withdraw soil gases and entrained liquid, since it will be unable to lift a column of liquid above to the soil surface. Therefore, at present, two phase extraction cannot be undertaken at sites where the surface of the water or liquid in the borehole is greater than about thirty feet beneath the soil surface. For similar reasons, in certain single phase extraction systems, the presence of a liquid layer makes the use of a single vacuum extraction system highly impractical.

SUMMARY OF THE INVENTION

It has now been found, however, that two phase extraction can be accomplished in wells of nearly any depth having water or other liquid therein where the liquid surface is at a level greater than thirty feet beneath the soil surface or using existing wells having screening below the water table at practically any depth. The present invention provides methods and apparatus which introduce a quantity of air or other gas into the liquid within the borehole via a priming tube, and thereby disperse the liquid into droplets which may be carried up the riser pipe by the effect of the vacuum pump.

The present invention provides apparatus for extracting materials from a borehole or the like having a liquid layer therein which comprises a riser pipe disposed within the borehole and extending at least partially into the liquid layer within the borehole. The borehole itself or other excavation such as a trench may be oriented in the vertical, horizontal or any direction. A vacuum source for extracting materials is connected to the riser pipe means. A priming tube for admitting a quantity of gas into the borehole is provided which extends at least partially into the liquid layer within the borehole. In operation, the vacuum source means creates a negative pressure within the riser pipe and the priming tube admits a quantity of gas into the liquid, thereby causing the liquid to be dispersed into droplets and extracted. In a preferred embodiment of the present invention, a priming valve means for controlling the quantity of gas admitted into the liquid via the priming tube is provided. In certain embodiments an air compressor or a source of gas is connected to the priming valve means. Most preferably, the priming tube is disposed substantially coaxially within the riser pipe, and the riser pipe is connected to the vacuum source by a fitting comprising at least three branches, most preferably a "tee" fitting. The priming valve is also preferably connected to the fitting and the priming tube is disposed within the fitting and connected to the priming valve. In certain embodiments, the priming valve is a regulating valve and the priming tube may be comprised of a flexible material. The apparatus of the present invention is operable either using a vacuum source which forms part of a single phase extraction system for removing contaminants or a two phase extraction system. In either a two phase or a single phase extraction system, the present invention permits the withdrawal of liquids or gases using vacuum extraction in cases where the riser pipe extends into a liquid layer which lies beneath the soil surface.

The present invention also provides methods of extracting materials from a borehole or the like having a liquid layer therein comprising the steps of placing a riser pipe means within the borehole and extending the riser pipe at least partially into the liquid layer within the borehole. The riser pipe is then connected to a vacuum source for extracting materials. By providing a priming tube for admitting a quantity of gas into the borehole and extending the priming tube means at least partially into the liquid layer within the borehole, extraction is facilitated when the vacuum source means is operated to create a negative pressure within the riser pipe. In this instance, the priming tube admits a quantity of gas into the liquid, thereby causing the liquid to be dispersed into droplets and extracted.

The methods of the present invention are applicable to methods wherein the vacuum source means is operated to extract materials in a single phase process as well as to those processes wherein the vacuum source means is operated to extract materials in a two phase process.

BRIEF DESCRIPTION OF THE DRAWINGS

There is seen in the drawings a form of the invention which is presently preferred, but it should be understood that the invention is not limited to the precise arrangements and instrumentalities illustrated.

DETAILED DESCRIPTION OF THE PREFERRED EMBODIMENTS

Figure 1:
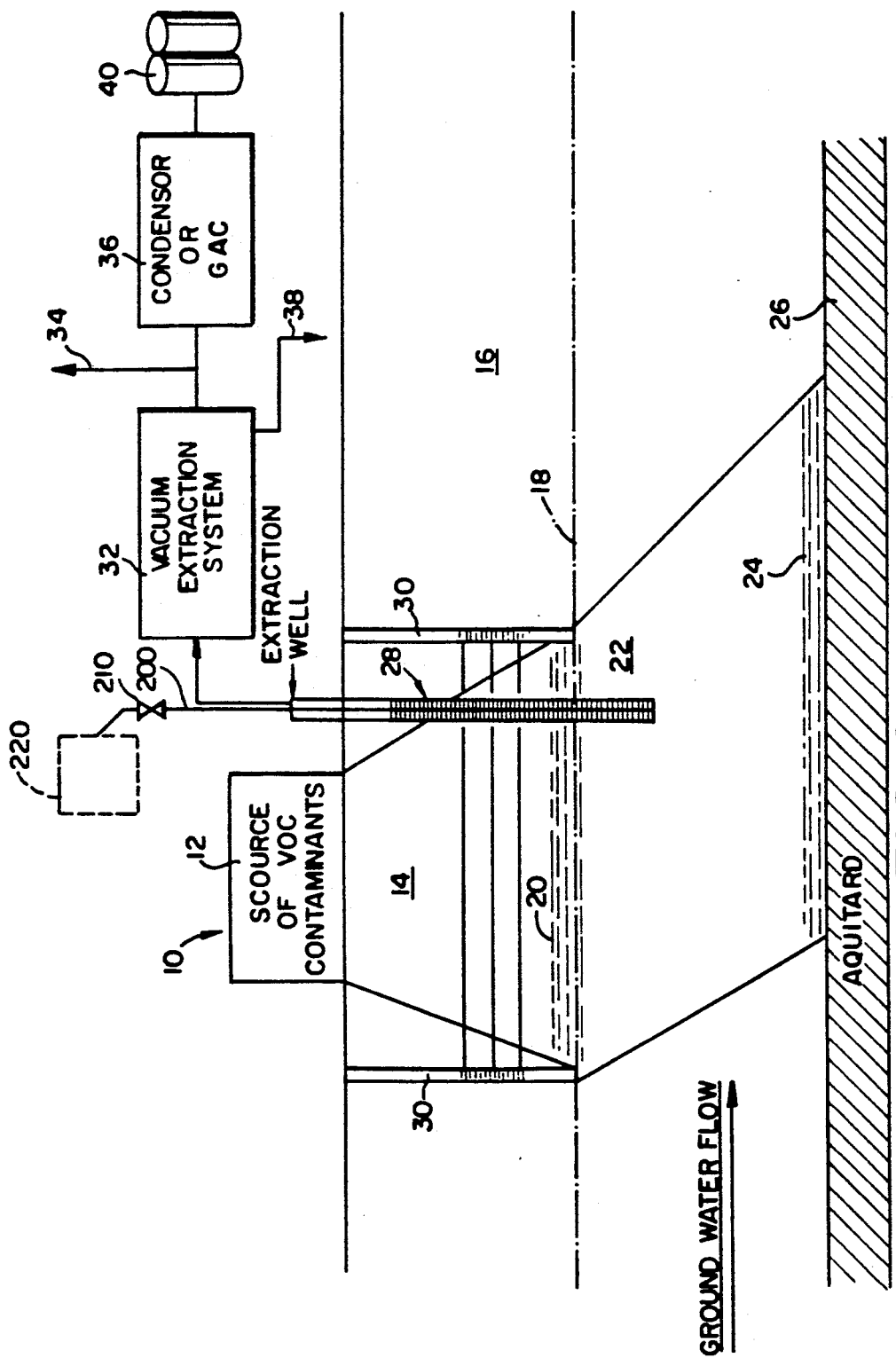
FIG. 1 is a side elevation view, in cross-section, illustrating somewhat schematically an arrangement for two phase vacuum extraction for removal of contaminants from a contaminated area of the ground.

Referring now to FIG. 1, there is seen schematically a system, designated generally by the reference numeral 10, for two phase vacuum extraction and treatment substantially in accordance with the invention disclosed in U.S. patent application Ser. No. 413,273, filed on Sept. 27, 1989. Seen in FIG. 1 is a source 12 of volatile contaminants, creating a plume 14 of absorbed or suspended contaminants in the soil 16 of the vadose (unsaturated) zone. The contaminants making up the plume 14 tend to leach or percolate downwardly toward the natural water table 18. Components lighter than water and not dissolved are depicted by the reference numeral 20, and tend to float at the top of the water table. Dissolved contaminants and free-phase contaminants heavier than water tend to migrate downwardly in a plume 22 below the water table 18. Free-phase components 24 heavier than water may tend to be pooled at the aquitard 26.

An extraction well 28, which will be described in greater detail below, is sunk in the area of the plume 14 and extends through the vadose zone and below the natural water table 18. Spaced from the extraction well 25 are air inlet wells 30, and which will also be described in greater detail. Air inlet wells 30, it will be understood, are best disposed at spaced locations around the perimeter of the plume 14. Those skilled in the art will appreciate that the number and spacing of the air inlet wells 30 with respect to the plume 14 and extraction well 28 will depend upon the size of the plume 14, as well as the composition and permeability of the soil to be treated.

As indicated above, the present invention overcomes a limitation of the process illustrated in FIG. 1 in that it was previously unlikely to be effectively operable if the depth of the liquids in the well 28, either at the water table or floating on the water, exceeded about thirty feet. As shown in greater detail below, a priming tube 200 is provided which extends into the liquid at the bottom of the well. This tube 200 mixes air or other gas with the liquid and thus "primes" the two phase extraction system. In the context of the present invention, the term "priming" of an extraction system is defined as introducing sufficient gas into a liquid to enable the vacuum supplied by a vacuum extraction system 32 to withdraw a stream of liquid particles dispersed in the gas column above the surface of the liquid out of the well. The vacuum extraction system 32 may either be single phase or two phase. A valve 210 is preferably provided at the top of the priming tube 200 which permits the selective admission of air or other gas. As shown in phantom, in certain embodiments, apparatus 220 such as an air compressor or a source of gas other than air is also provided to facilitate the two phase extraction process.

Connected to the extraction well 28 is a vacuum extraction system 32. Gases removed by the vacuum extraction system 32 may be vented to atmosphere 34 if within acceptable environmental limits, or further processed such as by being incinerated or passed to a condenser, granular activated carbon filter, or other such component 36. The component 36 serves to remove contaminants from the extracted gases. Water extracted by the process may be treated by passing it through conventional systems for metals removal, volatile organic compound removal, or other steps of purification. The treated and purified water, if it is of sufficient purity at this stage, may be returned to a sewer or directly to the ground as indicated at 38. Contaminants may be stored in drums 40 for eventual destruction or further processing.

Figure 2:
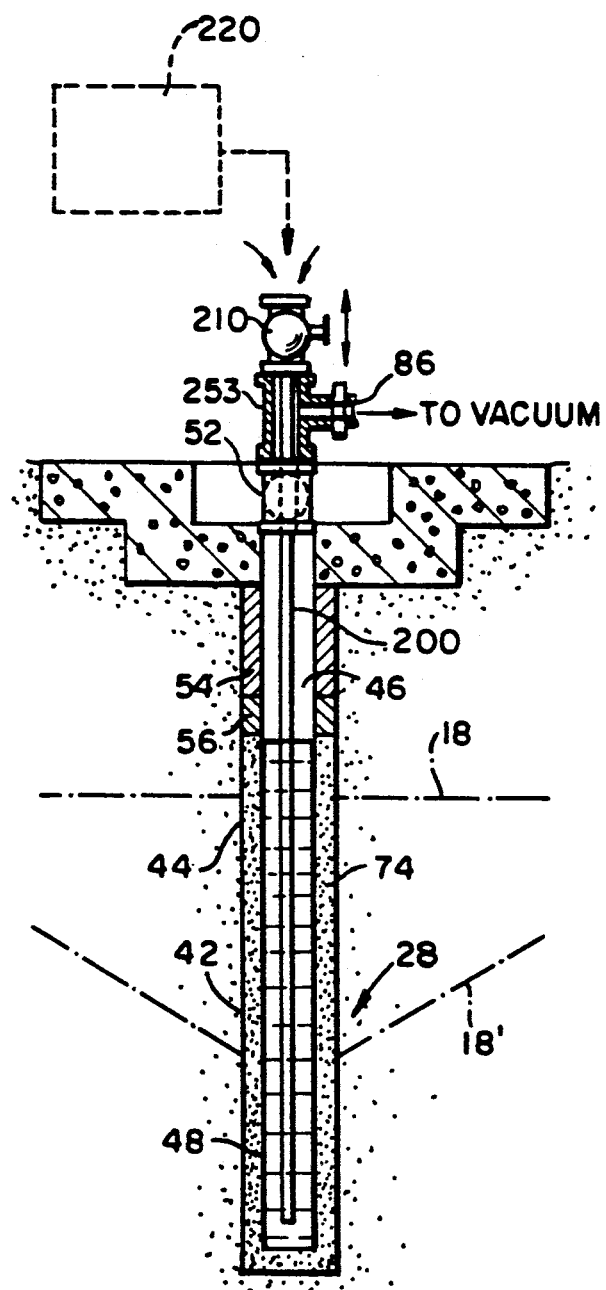
FIG. 2 is cross-sectional view, in side elevation, of an extraction well which may be used with the apparatus of FIG. 1.

Referring now to FIG. 2, the extraction well 28 will be described in greater detail. The extraction well 28 in a preferred embodiment of the invention includes an elongated borehole 42, into which there is placed a riser pipe 44. The riser pipe 44 preferably includes an imperforate upper portion 46 and a perforate (screened) lower portion 48. In one operative example, the riser pipe 44 is of four inch diameter PVC pipe, capped at the bottom, and the screen is formed by a plurality of 0.010 inch slots. In the operative example of U.S. patent application Ser. No. 413,237 filed on Sept. 27, 1989, the riser pipe 44 was approximately twenty feet in length, with the lower fifteen feet comprising the slotted lower portion 48 and the upper five feet the imperforate upper portion 46. However, the riser pipe 44 used in the present invention may be any length and will most preferably include pipes having a length greater than thirty feet.

The imperforate upper portion of the riser pipe 46 is here shown to be associated with a concrete floor or deck, however, the system of the present invention may be constructed independently of such a floor or deck, e.g., in an outdoor setting. The imperforate end of the riser pipe 46 is provided with a suitable pipe fitting 52, enabling the riser pipe 44 to be coupled in fluid communication to the remainder of the vacuum extraction system 32 (not seen in FIG. 2) by a connecting pipe 86. The upper portion 46 of the riser pipe 44 is surrounded by a low permeability non-shrink grout 54 and by a seal 56. The area within the borehole 42 surrounding the slotted or screened lower portion 48 of the riser pipe 44 and part of the imperforate upper portion 46 above the screened or slotted lower portion 48 is packed with fine screened sand 74 or other permeable material such as gravel, to facilitate the flow of gas and liquid from the surrounding soil into the riser pipe 44 while preventing the collapse of the borehole walls. In a preferred embodiment, the extraction well 28 is constructed so that the screened lower portion 48 extends below the natural water table 18 and upwardly into the vadose zone. The vadose zone into which the screened lower portion 48 extends may be above the natural water table 18, or may be above the expanded artificial vadose zone created when prolonged removal of ground water through the extraction well causes local lowering of the water table as indicated by the reference numeral 18' in FIG. 2.

The priming tube 200 for introducing air or gas into the liquid at the bottom of the well is also shown in FIG. 2. Preferably, the priming tube 200 is provided with a valve 210 which permits the selective addition of air into the tube 200 and thus into the liquid at the lower end of the well. The valve 210 may be a simple on/off valve or may be capable of regulating the volume of air or other gas admitted to the priming tube 200. As will be explained in greater detail below, the priming valve 210 is attached to the end of the priming tube 200 which may be moved relative to the riser pipe 44. Thus, the priming tube is attached to the top of the well head in a manner which permits its insertion to a sufficient depth and also comprises means for retaining the priming tube at the selected depth. As indicated above, in certain embodiments, the priming tube 200 may be supplied with pressurized air or other pressurized gas, supplied by appropriate means 220 shown schematically in phantom in FIG. 2. Placement of the screened lower portion 48 of the riser pipe 44 as indicated allows soil gases (the vapor phase) to be drawn into the well under the influence of vacuum created by the extraction system 32 and to entrain the liquid phase so that both phases may be transported to the surface together. The introduction of air or other gases into the liquid at the bottom of the well by the priming tube 210 ensures entrainment even when the depth of the water table 18 exceeds about thirty feet, and generally tends to aid in the extraction at all depths regardless of where the screened interval begins and ends. The methods and apparatus of the present invention may be applied to nearly any existing well of borehole, no matter how constructed.

Alternatively, the extraction well 28 may be so constructed that the screening of the lower portion 48 is entirely submerged, i.e., disposed below the natural or actual water table, even after withdrawal of water from the aquifer under the influence of the vacuum extraction system 32. In the latter case, the fluid transported to the surface would be predominantly in the liquid phase if the system described in U.S. patent application Ser. No. 413,273 filed on Sept. 27, 1989 were utilized. However, the priming tube 100 provided by the present invention would again introduce air or other gas into the liquid and facilitate extraction in a two phase flow regime in those instances where the vacuum extraction system was unable to lift the liquid from the well.

Figure 3:
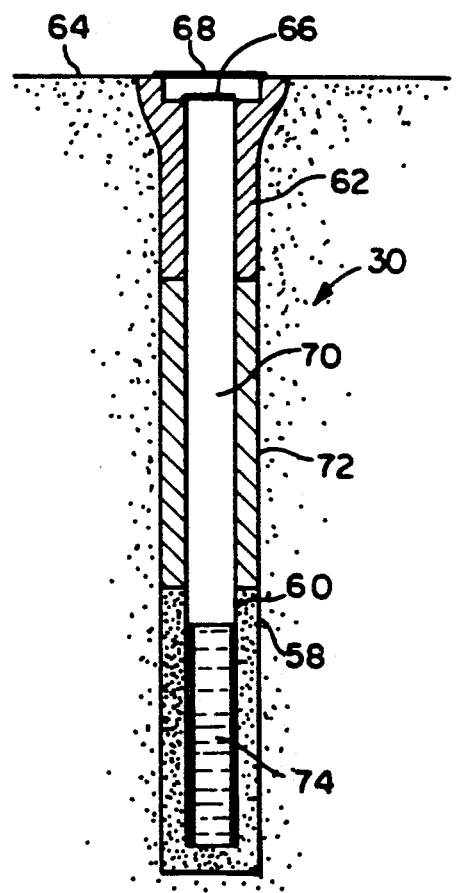
FIG. 3 is a cross-sectional view, also in side elevation, of a primed two phase air inlet well intended for use in a two phase extraction system.

Referring now to FIG. 3, there is seen an example of an air inlet well 30. The air inlet well 30 comprises a borehole 58, which receives a pipe 60. The pipe 60 in one operative embodiment comprises a four inch diameter PVC pipe, capped at the bottom, and having a screen of 0.010 inch slots. The pipe 60 is surrounded at its upper end by a cement collar 62, extending to the ground surface 64. Suitable caps 66 and covers 68 may be provided in association with the collar 62 to selectively cap or cover the injection well as desired. Surrounding a medial portion 70 of the pipe 60 within the borehole 58 is a non-shrink grout 72, which provides a gas-tight seal between the pipe 60 and the borehole 58. The slotted lower portion 74 of the pipe 60 is surrounded by gas-permeable packed sand 76. As will now be apparent, the pipe 60 facilitates the injection or admission of air into the zone surrounding the plume 14.

Figure 4:
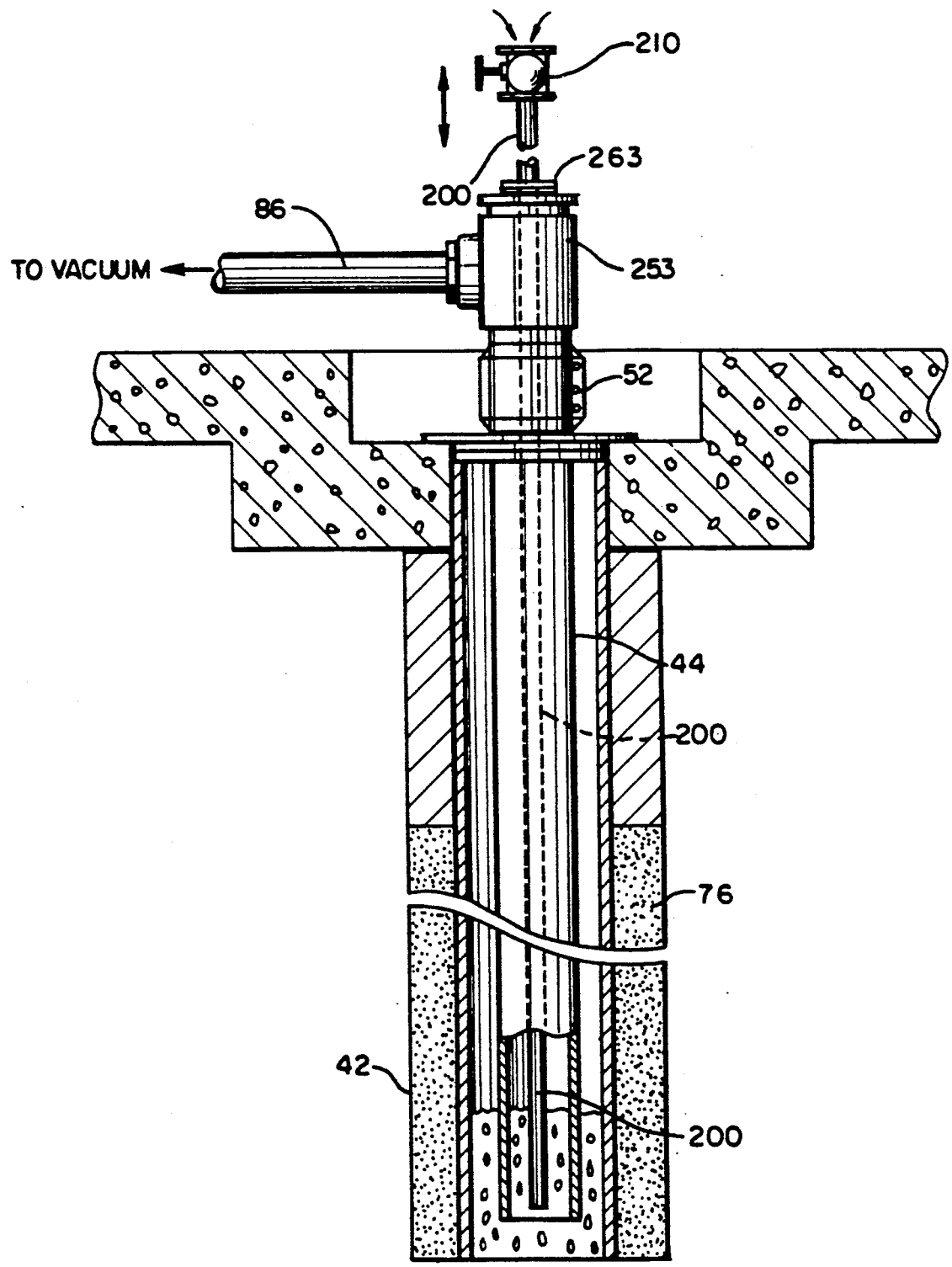
FIG. 4 is a cross-sectional view, in side elevation, of a primed two phase extraction well made in accordance with the present invention.

Further details of the priming tube 200 and associated priming valve 210 are shown in FIG. 4. As explained above, the present invention is preferably used in a conjunction with a borehole 42 having one or more portions of gas permeable packed sand or gravel 76 disposed therein. Disposed within the borehole is a riser pipe 44, which extends, in some applications, beneath the water table and thus terminates within a quantity of liquid. The priming tube 200 is preferably disposed within the riser pipe 44 and is of sufficient length to extend below the liquid surface. Near the soil surface, the riser pipe 44 is terminated by a pipe fitting 52, which is preferably further attached to a "tee" fitting 253. A pipe 86 connects one branch of the tee fitting to the vacuum extraction apparatus. The second branch of the tee fitting 253 is terminated by a cap or flange or bushing. The priming tube 200 is connected to the priming valve 210 and is disposed within the tee fitting 253, passing therethrough and into the interior of the riser pipe 44. As previously noted, the valve 210 may either draw ambient air or be connected to apparatus such as an air compressor or source of pressurized gas other than air (not shown in this view). The priming tube 200 is preferably affixed to the priming valve 210 through a nipple inside the cap or flange, or passes through an aperture in the cap or flange. The aperture may be adjustable by means of a clamp 263 and also provided with a seal such as a gasket or skirt which may be formed, for example, from a section of rubber tubing.

As will be readily understood by those of ordinary skill, the seal and clamp arrangement 263 may be provided to permit the depth of insertion of the priming tube 200 to be varied so that its lower open end is at an adequate depth below the surface of the liquid, thereby permitting the vacuum applied to overcome the liquid head above the lower end of the riser pipe 44 and inducing the inflow of air or gas and the subsequent establishment of a two phase flow regime. Alternatively, the priming valve 210 may be attached to a nipple disposed on the outside of the cap or flange aperture through which it communicates with the priming tube 200. Most preferably, however, the priming tube 200 will pass through a cap means by way of an aperture formed in the cap. The cap may comprise a bushing or flange, which cooperate with the clamp 263. Most preferably, the aperture will be adjustable so as to constrict around the priming tube. The aperture is thus capable of forming a seal, most preferably by providing a gasket or skirt which is adjustable using the clamp 263. Also, the constricting aperture functions to retain the priming tube 200 at the selected depth and permits it to be moved relative to the riser pipe 44 and to be secured in a particular location. The preferred apparatus described thus prevents air or gas leakage and allows adjustment of the depth of insertion of the priming tube 200 below the liquid surface.

Those of ordinary skill will also recognize that the construction illustrated represents one of many ways in which air or gas may be provided to the bottom of the well, numerous other methods and apparatus may be readily devised to accomplish the same goal. The embodiment depicted is preferred, however, since the use of a tee fitting 253 provides a convenient manner by which the riser pipe 44 may be connected to the vacuum extraction source 32 while permitting the priming tube 200 to be both disposed within the riser pipe 44 and connected to the priming valve 210 in a manner which also facilitates the incorporation of a clamp 263 which allows the depth to which the priming tube 200 extends to be adjusted.

Although the embodiments of the present invention described above are typically directed to remedial processes whereby volatile and other contaminants are removed from a contaminated zone of soil or from the aquifer, those of ordinary skill will realize that numerous other situations present themselves which make two phase material transfer a desireable process. For example, the present invention may be used to enhance the production of water from a low-yielding aquifer. Similarly, the production of low yielding oil wells can also be enhanced by a primed two phase extraction process.

Additionally, the two phases extracted by the present invention do not have to be liquid and gas. In certain clean up operations, such as the emptying of grain silos or ship holds used to transport grains or granular materials such as sand the present invention may be utilized to more efficiently empty such vessels. The priming tube would entrain the granular material in the air inside the tank or hold and permit it to be more effectively extracted by a vacuum system. Similarly, applications wherein the two "phases" are comprised of liquids having different specific gravities are also contemplated. For example, using the present invention, the efficient extraction of contaminants or liquid materials which are underwater, e.g., under the bed of the ocean or beneath an aquifer which rests on an aquitard, and which are heavier than water can now be achieved. The priming tube would again break up of entrain the heavier than water materials and permit them to be extracted.

Thus, the present invention may be embodied in many other specific forms without departing from its spirit and essential attributes. Accordingly, reference should be made to the appended claims rather than the foregoing specification as indicating the scope of the invention.

We claim:

1. A method of extracting materials from a borehole having a liquid layer therein comprising the steps of:
   placing a riser pipe within said borehole and extending said riser pipe at least partially into said liquid layer within said borehole;
   closing said borehole with a cap having a riser valve;
   connecting said riser valve directly to a vacuum source means for extracting materials;
   providing priming tube means for admitting a quantity of gas into the liquid layer within said borehole and extending said priming tube means through the borehole cap and at least partially into said liquid layer within said borehole both within and outside the riser pipe;

opening a priming valve means for controlling the quantity of gas in said priming tube means; and operating said vacuum source means to create a negative pressure within said riser pipe;

whereby said priming tube causes a quantity of gas to contact said liquid, thereby stripping materials from the liquid causing them to be extracted by the vacuum, and dispersing a portion of the liquid into droplets that are extracted by the vacuum.

2. The method of claim 1 wherein said vacuum source means is operated to extract materials in a single phase process.

3. The method of claim 1 wherein said vacuum source means is operated to extract materials in a two phase process.

4. A process for two phase removal of contaminants from a contaminated area of the ground, wherein the contaminated area has a subsurface water table and a vadose zone above the water table, contaminants being present in the vadose zone and below the water table, comprising the steps of:

providing a borehole in a selected portion of the contaminated area;

placing in the borehole a perforated riser pipe, the riser pipe being placed so that the perforations of the riser pipe are disposed below the natural water table;

placing in the borehole a priming tube, the priming tube being placed so as to extend below the natural water table;

applying a vacuum to the riser pipe so as to draw soil gases and entrained liquid into the riser pipe and transport both the gases and the liquid to the surface as a common stream, and so as to draw a gas through said priming tube and into said contaminants;

forming from the common stream a stream which is primarily liquid and a stream which is primarily gaseous; and separately treating the separated liquid and gas streams.

5. A process in accordance with claim 4, wherein the riser is so placed that the perforations of the pipe are placed both in the vadose zone and below the natural water table.

* * * * *